United States Patent [19]

Chu

[11] Patent Number: 5,305,307
[45] Date of Patent: Apr. 19, 1994

[54] ADAPTIVE ACOUSTIC ECHO CANCELLER HAVING MEANS FOR REDUCING OR ELIMINATING ECHO IN A PLURALITY OF SIGNAL BANDWIDTHS

[75] Inventor: Peter L. Chu, Needham, Mass.

[73] Assignee: PictureTel Corporation, Peabody, Mass.

[21] Appl. No.: 659,579

[22] Filed: Feb. 21, 1991

Related U.S. Application Data

[63] Continuation-in-part of Ser. No. 640,477, Jan. 11, 1991, abandoned, which is a continuation of Ser. No. 637,016, Jan. 4, 1991, abandoned.

[51] Int. Cl.$^5$ .............................................. H04J 1/00
[52] U.S. Cl. ................... 370/32.1; 379/406; 381/71
[58] Field of Search .............. 370/32.1; 381/46, 47, 381/66, 71, 83; 379/345, 392, 410, 406

[56] References Cited

U.S. PATENT DOCUMENTS

| | | | |
|---|---|---|---|
| 4,064,378 | 12/1977 | Kitayama et al. | 179/170.2 |
| 4,126,770 | 11/1978 | Tamaura et al. | 179/170.2 |
| 4,232,400 | 11/1980 | Yamamoto et al. | 455/305 |
| 4,479,036 | 10/1984 | Yamamoto et al. | 179/170.2 |
| 4,525,856 | 6/1985 | Admiraal et al. | 381/93 |
| 4,589,137 | 5/1986 | Miller | 381/94 |
| 4,623,980 | 11/1986 | Vary | 379/410 |
| 4,633,046 | 12/1986 | Kitayama et al. | 370/32.1 |
| 4,658,426 | 4/1987 | Chabries et al. | 381/94 |
| 4,677,676 | 6/1987 | Eriksson | 381/71 |
| 4,677,676 | 6/1987 | Eriksson | 381/71 |
| 4,683,590 | 7/1987 | Miyoshi et al. | 381/71 |
| 4,769,847 | 9/1988 | Taguchi | 381/94 |
| 4,823,382 | 4/1989 | Martinez | 379/411 |
| 4,837,834 | 6/1989 | Allie | 381/71 |
| 5,022,074 | 6/1991 | Nicholas | 379/407 |

FOREIGN PATENT DOCUMENTS 219136 10/1985 United Kingdom.

OTHER PUBLICATIONS

P. L. Chu, "Quadrature Mirror Filter Design for an Arbitrary Number of Equal Bandwidth Channels", IEEE Trans. on ASSP, ASSP-33, No. 1, Feb., 1985, pp. 203-218.

P. L. Chu, "Fast Gaussian Random Noise Generator," IEEE Trans. ASSP, ASSP-37, No. 10, Oct., 1989, pp. 1593-1597.

(List continued on next page.)

*Primary Examiner*—Douglas W. Olms
*Assistant Examiner*—Shick Hom
*Attorney, Agent, or Firm*—Hale and Dorr

[57] ABSTRACT

An echo cancelling device for reducing acoustic feedback between a loudspeaker and microphone in a full duplex communication system such as a telephone conferencing system. The device includes a whitening filter which flattens the microphone signal's spectrum and reduces its auto-correlation. A first signal splitter separates the whitened microphone signal into a plurality of bandlimited microphone signals. The loudspeaker signal is similarly whitened and separated into a plurality of bandlimited loudspeaker signals. A plurality of adaptive echo estimators estimate the echo in each frequency band defined by the above signal splitters. More specifically, each estimator generates an echo estimation signal representing an approximation of the acoustic feedback of a corresponding bandlimited loudspeaker signal into the microphone. To cancel echo, a subtractor removes each echo estimation signal from the bandlimited microphone signal of the same frequency band as the estimation signal. The device further processes the echo corrected signal in each band with a center clipper, to remove any residual echo, and with a noise filler to simulate the background signals removed by the clippers.

40 Claims, 9 Drawing Sheets

OTHER PUBLICATIONS

D. L. Duttweiler, "A Twelve-Channel Digital Voice Echo Canceller," IEEE Transactions on Communications, COM-26, No. 5, May, 1978, pp. 647–653.

S. Gay, "Fast Converging Subband Acoustic Echo Cancellation Using RAP on the WE© DSP/16A," Proceedings of ICASSP 1990.

A. Gilloire, "Experiments with Sub-Band Acoustic Echo Cancellers for Teleconferencing," Proceedings of ICASSP 1987.

M. J. Gingell, B. G. Hay, and L. D. Humphrey, "A Block Mode Update Echo Canceller Using Custom LSI," Globecom Conference Record, vol. 3, Nov., 1983, pp. 1394–1397.

D. G. Messerschmitt, "Echo Cancellation in Speech and Data Transmission," IEEE Journal on Selected Topics in Communications, SAC-2, No. 2, Mar., 1984, pp. 283–296.

Ying G. Tao, Kevin D. Kolwica, C. W. K. Gritton, and Donald D. Duttweiler, "A Cascadable VLSI Echo Canceller", IEEE Journal on Selected Topics in Communications, SAC-2, No. 2, Mar., 1984, pp. 297–303.

S. Yamamoto, S. Kitayama, J. Tamura, and H. Ishigami, "An Adaptive Echo Canceller with Linear Predictor," The Transactions of the IECE of Japan, vol. E62, No. 12, Dec., 1979, pp. 851–857.

5,305,307

ADAPTIVE ACOUSTIC ECHO CANCELLER HAVING MEANS FOR REDUCING OR ELIMINATING ECHO IN A PLURALITY OF SIGNAL BANDWIDTHS

This is a continuation-in-part of copending application, Ser. No. 07/640,447, filed on Jan. 11, 1991 which is a continuation of copending application Ser. No. 07/637,016 filed on Jan. 4, 1991, both now abandoned.

This specification includes a microfiche appendix having three sheets of microfiche which collectively contain two hundred and thirteen frames.

BACKGROUND OF THE INVENTION

The invention relates generally to reducing unwanted audio or acoustic feedback in a communication system, and particularly to an adaptive acoustic echo cancellation device for suppressing acoustic feedback between the loudspeaker and microphone of a telephone unit in a teleconferencing system. The telephone unit of a typical audio conferencing system includes a loudspeaker for broadcasting an incoming telephone signal into an entire room. Similarly, the telephone's microphone is typically designed to pick up the voice of any person within the room and transmit the voice to a remote telephone at the far end of the communication system.

Unlike conventional hand held telephone sets, conference telephone units are prone to acoustic feedback between the loudspeaker unit and microphone. For example, a voice signal which is broadcast into the room by the loudspeaker unit may be picked up by the microphone and transmitted back over the telephone lines. As a result, persons at the far end of the communication system hear an echo of their voice. The echo lags the person's voice by the round trip delay time for the voice signal. Typically, the echo is more noticeable as the lag between the person's voice and the echo increases. Accordingly, it is particularly annoying in video conferencing systems which transmit both video and audio information over the same telephone lines. The additional time required to transmit video data increases the round trip delay of the audio signal, thereby extending the lag between a person's voice and the echo.

Many conference telephones avoid echo by allowing only half duplex communication (that is, by allowing communication over the phone line to occur in only one direction at a time) thereby preventing feedback. For example, when the loudspeaker unit is broadcasting a voice, the telephone disables the microphone to prevent the loudspeaker signal from being fed back by the microphone.

While a half duplex system avoids echo, it often cuts off a person's voice in mid-sentence. For example, when both parties speak simultaneously, the telephone unit allows communication in only one direction, thereby clipping the voice of one party.

Some loudspeaker telephones employ echo cancellation in an attempt to allow full-duplex communication without echo. Conventional echo cancellation devices attempt to remove from the microphone signal the component believed to represent the acoustic feedback. More specifically, they prepare an electric signal which duplicates the acoustic feedback between the loudspeaker and the microphone. This electric signal is subtracted from the microphone signal in an attempt to remove the echo.

Electrically duplicating the acoustic feedback is difficult since the acoustic response of the room containing the microphone and speaker must in essence be simulated electrically. This is complicated by variations in the acoustic characteristics of different rooms and by the dramatic changes in a given room's characteristics which occur if the microphone or loudspeaker is moved, or if objects are moved in the room.

To compensate for the changing characteristics of the room, many echo cancellation devices model the room's characteristics with an adaptive filter which adjusts with changes in the room. More specifically, the electric signal used to drive the telephone's loudspeaker is applied to a stochastic gradient least-means-squares adaptive filter whose tap weights are set to estimate the room's acoustic response. The output of the filter, believed to estimate the acoustic echo, is then subtracted from the microphone signal to eliminate the component of the microphone signal derived from acoustic feedback. The resultant "echo corrected" signal is then sent to listeners at the far end of the communication system.

To assure that the adaptive filter accurately estimates the room's response, the device monitors the echo corrected signal. During moments when no one is speaking into the microphone, the adaptive filter adjusts its tap weights such that the energy of the echo corrected signal is at a minimum. In theory, the energy of the echo corrected signal is minimized when the adaptive filter removes from the microphone signal an accurate replica of the acoustic feedback. However, the adaptive process must be disabled whenever a person speaks into the microphone. Otherwise, the unit will attempt to adjust the tap weights in an effort to eliminate the speech.

Since a speech signal is highly correlated, the adaptive filter tends to converge very slowly. Accordingly, some commercial echo cancellation devices attempt to measure the room's acoustic response using a white noise training sequence. During the training sequence, an unpleasant white noise is emitted from the loudspeaker and is acoustically fed back to the microphone. The white noise received by the microphone is a highly uncorrelated signal, causing the adaptive filter to converge quickly. If the filter loses convergence during the conversation, the training sequence must be repeated, briefly interrupting conversation with an annoying white noise signal.

Therefore, one object of the present invention is to provide an acoustic echo cancellation device which allows full duplex communication while reducing or eliminating echo. A further object is to eliminate the need for a training sequence with a relative simple filter design which converges quickly.

SUMMARY OF THE INVENTION

The invention relates to a method and apparatus for reducing acoustic feedback in a full duplex communication system. The method includes separating a near end microphone signal into a plurality of bandlimited microphone signals, and similarly separating a near end loudspeaker signal into a plurality of bandlimited loudspeaker signals. Each bandlimited loudspeaker signal is filtered to generate an echo estimation signal which represents an approximation of the acoustic feedback of the bandlimited loudspeaker signal into the near end microphone signal. Each echo cancellation signal is subtracted from the bandlimited microphone signal whose frequency band includes the frequencies of the echo cancellation signal, thereby removing an estimation of the echo in that frequency band.

In one embodiment, a plurality of adaptive filters, each having tap weights which adapt with changes in the acoustic characteristics of the channel between a loudspeaker and microphone are used to generate the echo estimation signals. The performance of the adaptive filter for each band is monitored to determine when the filter's tap weights are diverging. If a given filter begins to diverge, its tap weights are reset. In embodiments employing adaptive filters, the full band microphone signals and full band loudspeaker signals may each be filtered with a whitening filter prior to being separated into bandlimited signals, thereby hastening the convergence of the adaptive filters and discouraging divergence.

Other embodiments further process each echo corrected bandlimited microphone signal to remove any residual echo. More specifically, the echo corrected bandlimited microphone signal in a given band is monitored to determine when there is approximately no near end speech in that band. During such moments, the echo corrected microphone signal in that band is gradually clipped to zero to remove residual echo in that band. During moments when the microphone signal in a given band is being clipped, a simulated background signal is supplied which simulates background sounds from the near end.

Other objects, features and advantages of the invention are apparent from the following description of particular preferred embodiments taken together with the drawings.

DESCRIPTION OF THE PREFERRED EMBODIMENTS

Figure 1:
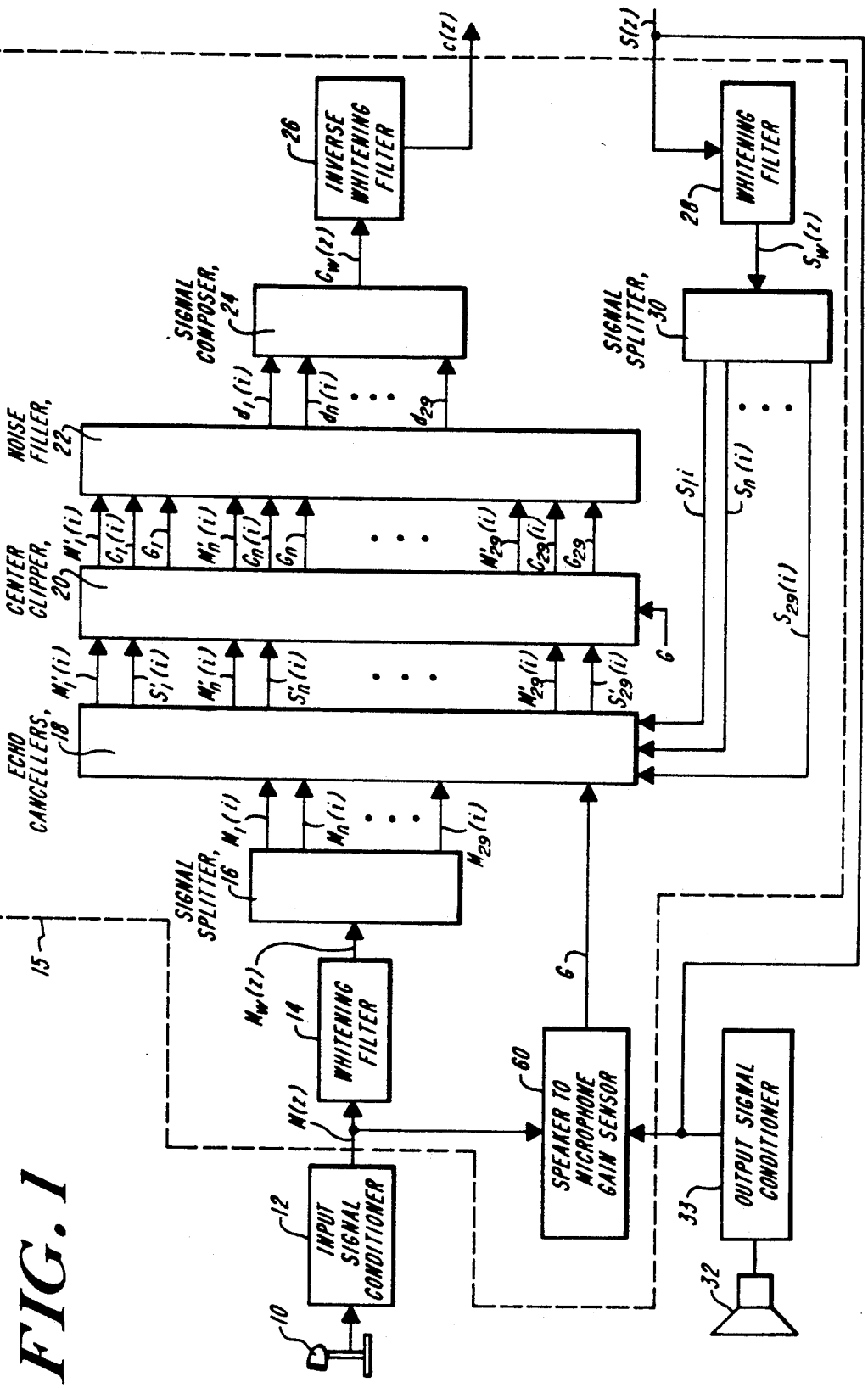
FIG. 1 is a block diagram of an echo cancellation device in accordance with the claimed invention.

Referring to FIG. 1, a microphone 10 converts speech and other acoustic signals in a room into an analog electronic microphone signal. The electronic signal is applied to input signal conditioner 12 which filters the signal with a 7 KHz low pass filter and digitizes the filtered signal at a 16 KHz sampling rate. The resultant digitized microphone signal m(z) (where z is an integer representing the time at which the sample m(z) was taken measured in terms of a number of samples at the 16 khz sampling rate) is applied to echo cancellation system 15 which processes the microphone signal to remove any echo components, and transmits the echo corrected signal to the far end of the communication system. Echo cancellation system 15 is preferably implemented by a 60 MHz DSP16A processor executing the program shown in the microfiche appendix to this specification.

A digitized electronic speaker signal s(z), representing the voice of persons at the far end of the communication system, is received at the near end of the system. The speaker signal s(z) is applied to an output signal conditioner 33 which processes the signal, converting it to an analog electronic signal. The analog signal is applied is loudspeaker 32 which reproduces the voice signal, broadcasting the reproduced voice into the room. The digitized speaker signal s(z) is also applied to echo cancellation system 15 for use in estimating the echo contained in the microphone signal.

Within echo cancellation system 15, m(z) is first passed through a whitening filter 14 which spreads the spectrum of m(z) more evenly across the bandwidth of m(z) while preserving the voice information contained in m(z). The resultant whitened signal $m_w(z)$ generated by filter 14 is then applied to a splitter 16 which separate $m_w(z)$ into twenty-nine distinct frequency bands and shifts each band limited signal into the baseband.

The bandlimited signals $m_n(i)$ (where i represents the time at which the sample $m_n(i)$ is taken measured in terms of a number of samples taken at a lower sample to be discussed below) are then applied to a bank 18 of echo cancellers which subtract from each signal $m_n(i)$ an estimation of the echo in the band n. To estimate the echo in each band, the loudspeaker signal s(z) is whitened and band filtered in the same manner as the microphone signal m(z). More specifically, s(z) is passed through a whitening filter 28 which is similar to or identical to whitening filter 14. The whitened loudspeaker signal $s_w(z)$ is then separated by signal splitter 30 into its spectral components, represented by a set of twenty-nine bandpass loudspeaker signals $s_b(i)$, and each component is shifted into the baseband. As will be explained more fully below, each bandpass loudspeaker signal $s_n(i)$ is then passed through a corresponding least-means-squared filter (within the bank of echo cancellers 18) which models the response of the channel between loudspeaker 32 and microphone 10 in the frequency band n. The output of each filter is used as the estimated echo signal to be subtracted from $m_n(i)$.

Subtracting the estimated echo signal from the corresponding band limited microphone signal $m_n(i)$ eliminates most of the acoustic feedback between loudspeaker 32 and microphone 10 in band n. The remaining residual echo is typically not noticeable because the voice of persons speaking into microphone 10 tends to mask the presence of the residual echo. However, during moments when there is no such near end voice signal, the residual echo is more apparent.

To eliminate any noticeable residual echo, the echo corrected signals m'(i) are applied to a bank of twenty-nine center clippers 20. Bank 20 includes a center clipper for each bandlimited microphone signal $m'_n(i)$. Each center clipper monitors a corrected signal $m'_n(i)$ to determine when it falls below a certain threshold. When $m'_n(i)$ drops below the threshold, the center clipper assumes that $m'_n(i)$ contains no near end speech. Accordingly the clipper begins gradually attenuating the corrected signal $m'_n(i)$ to zero to eliminate the residual echo in band n.

Center clipping thus operates independently in each band. If a narrow band voice signal (e.g., a high pitched voice or a whistle) is applied to the microphone, center clipping will highly attenuate the microphone signal in all silent bands, allowing the bands containing the narrow band voice signal to pass without clipping. Thus, echo is completely eliminated in all attenuated bands containing no near end speech. In the other bands, the echo cancellers 18 remove most of the echo, any residual echo being masked by the narrow band voice signal.

While clipping eliminates noticeable residual echo, it introduces noticeable changes in background noise as it is activated and deactivated. For example, assume the microphone picks up the sound of a fan operating in the room at the near end of the communication system. Since this sound is not an echo, it tends to pass through the echo cancellers 18. However, when center clipping engages to fully eliminate echo, it also suppresses the sound of the fan. Thus, the listeners at the far end hear the fan drift in and out as clipping is engaged and disengaged. To eliminate this annoying side effect of center clipping, the clipped signals are applied to a bank of noise fillers which add to the clipped signals a noise signal which mimics the clipped background noise.

After the bandlimited signals are processed by bank 22 of noise fillers, they are applied to composer 24 which assembles them into a composite signal $c_w(z)$. Finally, the composite signal $c_w(z)$ is applied to an inverse whitening filter 26 which performs the inverse operation of the whitening filter 14, thereby returning the signal to a form ready for transmission to listeners at the far end.

Figure 2:
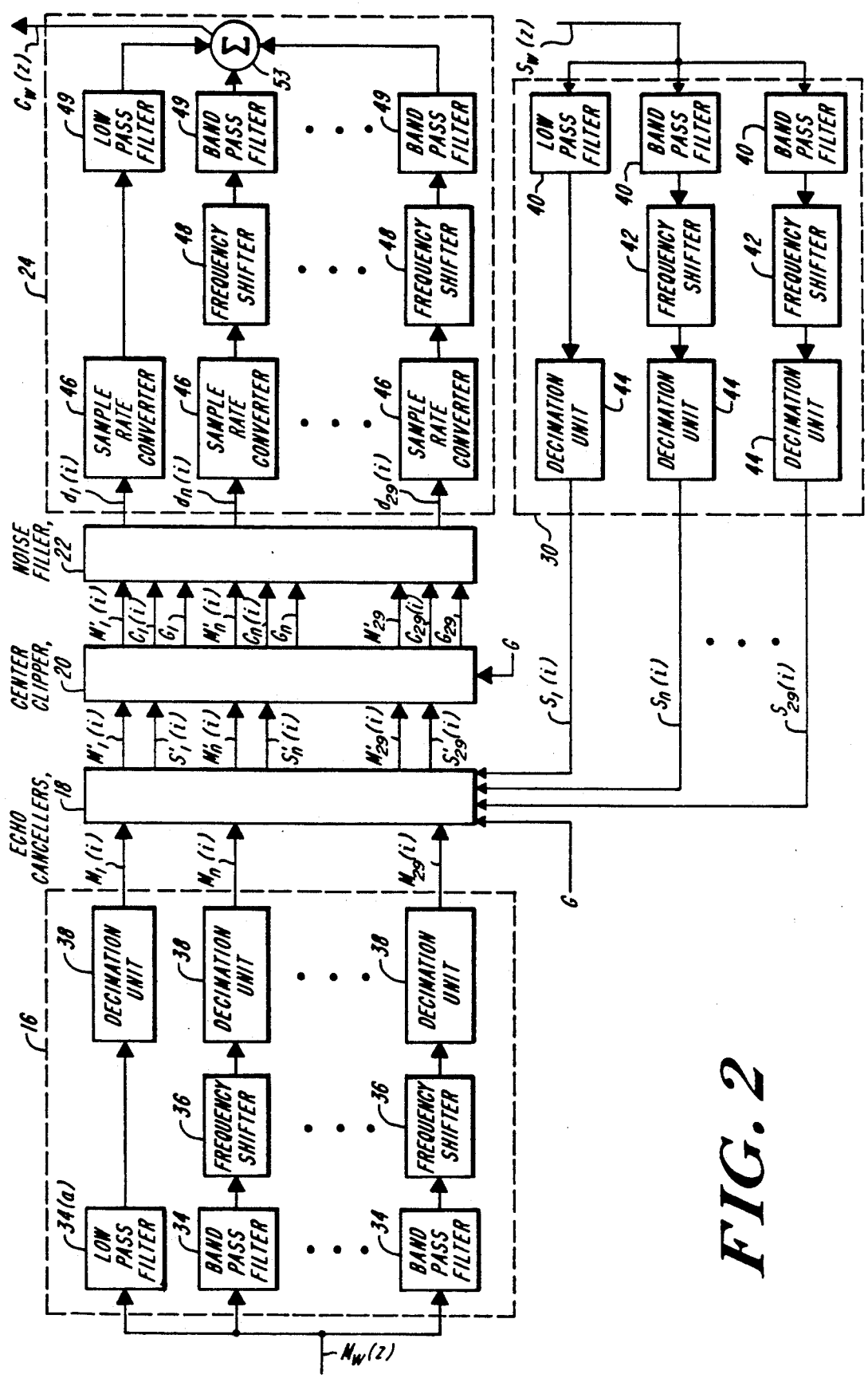
FIG. 2 is a block diagram of an echo cancellation device, showing the signal splitters in further detail.

Referring to FIG. 2, the separation of the microphone and speech signals into a set of bandlimited signals is now described in more detail. Within splitter 16, the whitened microphone signal $m_w(z)$ is first applied to a bank of digital bandpass filters 34 which separate $m_w(z)$ into its spectral components. The bandwidths of the filters cover the entire 7 KHz frequency spectrum of $m_w(z)$ without gaps. Toward this end, the filter bandwidths preferably overlap.

Low complexity methods are known in the art for implementing a bank of bandpass filters in which each filter has the same bandwidth. See e.g., R. F. Crochiere et al., "Multirate Digital Signal Processing, Prentice Hall, Englewood Cliffs, N.J., 1983; P. L. Chu, "Quadrature Mirror Filter Design for an Arbitrary Number of Equal Bandwidth Channels," IEEE Trans on ASSP, ASSP-33, No. 1, February 1985 p. 203–218. A bank of filters made according to these techniques span frequencies from zero to one half the sampling rate of the signal applied to the bank of filters. The microphone signal $m(z)$ applied to the bank of bandpass filters 34 is sampled at 16 KHz. Accordingly, a bank of filters implemented according to the sampled techniques covers frequencies up to 8 KHz, i.e., one half the sampling rate. However, since $m(z)$ is previously low pass filtered by signal conditioner 12 to eliminate frequencies above 7 KHz, the highest frequency filters in the bank which lie in the low pass filter's transition band may be ignored.

Several factors must be weighed in choosing the number of filters in the bank. For example, using a large number of filters reduces the bandwidth of each filter, which, as be explained more fully below, reduces the number of computations required to process a given bandlimited signal. However, such reduction in bandwidth increases the delay introduced by each filter. Further, a large number of filters yield many bandlimited signals $m_n(i)$, thereby increasing the computational cost of implementing the bandpass filters, echo cancellers, center clippers and noise fillers. Accordingly, in the preferred embodiment, the bank of bandpass filters 34 contains 32 filters covering frequencies up to 8 KHz. Only the lower 29 filters are used, however, since the input microphone signal $m(z)$ has only a 7 KHz bandwidth.

Each filter 34 is a 192 tap, symmetric FIR (finite impulse response) filter having a magnitude response equal to the square root of a raised cosine. This response is preferable since it gives a smooth transition from passband to stopband. Each filter thus has a 250 Hz, 3 dB bandwidth and a 500 Hz, 40 dB bandwidth. Attenuation at the 500 Hz bandwidth must be high to prevent aliasing.

Each bandlimited signal (with the exception of the output of lowpass filter 34(a) which is baseband), is then applied to a frequency shifter 36 which modulates the bandlimited signal to shift its frequency spectrum downward to the baseband.

Since the full band microphone signal $m(z)$ is sampled at 16 KHz, each band limited signal is also sampled at the same 16 KHz rate. However, since each bandlimited signal has a much narrower bandwidth than the microphone signal, many of these samples are redundant. Accordingly, each bandlimited signal is decimated by a decimation unit 38 to reduce the sampling rate to approximately the Nyquist rate, that is, twice the bandwidth of the filter 34. In the preferred embodiment, decimation units 38 subsample at 1 KHz, or one sixteenth of the original sampling rate. This dramatically reduces the number of samples, thereby reducing the number of computations required in implementing the subsequent echo cancellation, center clipping and noise filling. Bandpass filters 34, frequencies shifters 36 and decimation units 38 are implemented in a Weaver single sideband modulator structure as proposed in R. E. Crochiere et al, "Multirate Digital Signal Processing", Prentice Hall, Englewood Cliffs, N.J. (1983).

The whitened loudspeaker signal $s_w(z)$ must also be split into its frequency components for purposes of estimating the echo in each band. Accordingly, $s_w(z)$ is passed through a bank of bandpass filters 40 which separate $s_w(z)$ into distinct frequency bands (which are the same as those used in the microphone path). The resultant bandlimited signals are then shifted downward in frequency to the baseband by frequency shifters 42, and undersampled by decimation units 44 to eliminate redundant samples.

The bandlimited microphone signals $mn(i)$ are processed by echo cancellers 18, center clippers 20 and noise filters 22 independently in each band. At the completion of this processing, the bandlimited signals are reconstructed into a composite signal $c_w(z)$. Accordingly, each bandlimited signal provided by noise fillers 22 is first applied to a set of sample rate convertors 46 which increase the sampling rate of each signal back to 16 KHz. More specifically, each sample rate converter adds fifteen new samples between each pair of existing samples, each new sample having a value of zero. Next, frequency shifters 48 shift each band limited signal upward in frequency to the band in which it initially resided. The resultant set of bandlimited signals are applied to a set of band pass filters 49 which, in effect, replace each of the new samples of value zero with a value derived from interpolating between neighboring samples. The signals are then applied to adder 53 which combines the bandlimited signals to yield the composite signal $c_w(z)$. A Weaver single sideband modulator structure is employed in implementing sample rate converters 46, frequency shifters 48, and bandpass filters 49.

Figure 3:
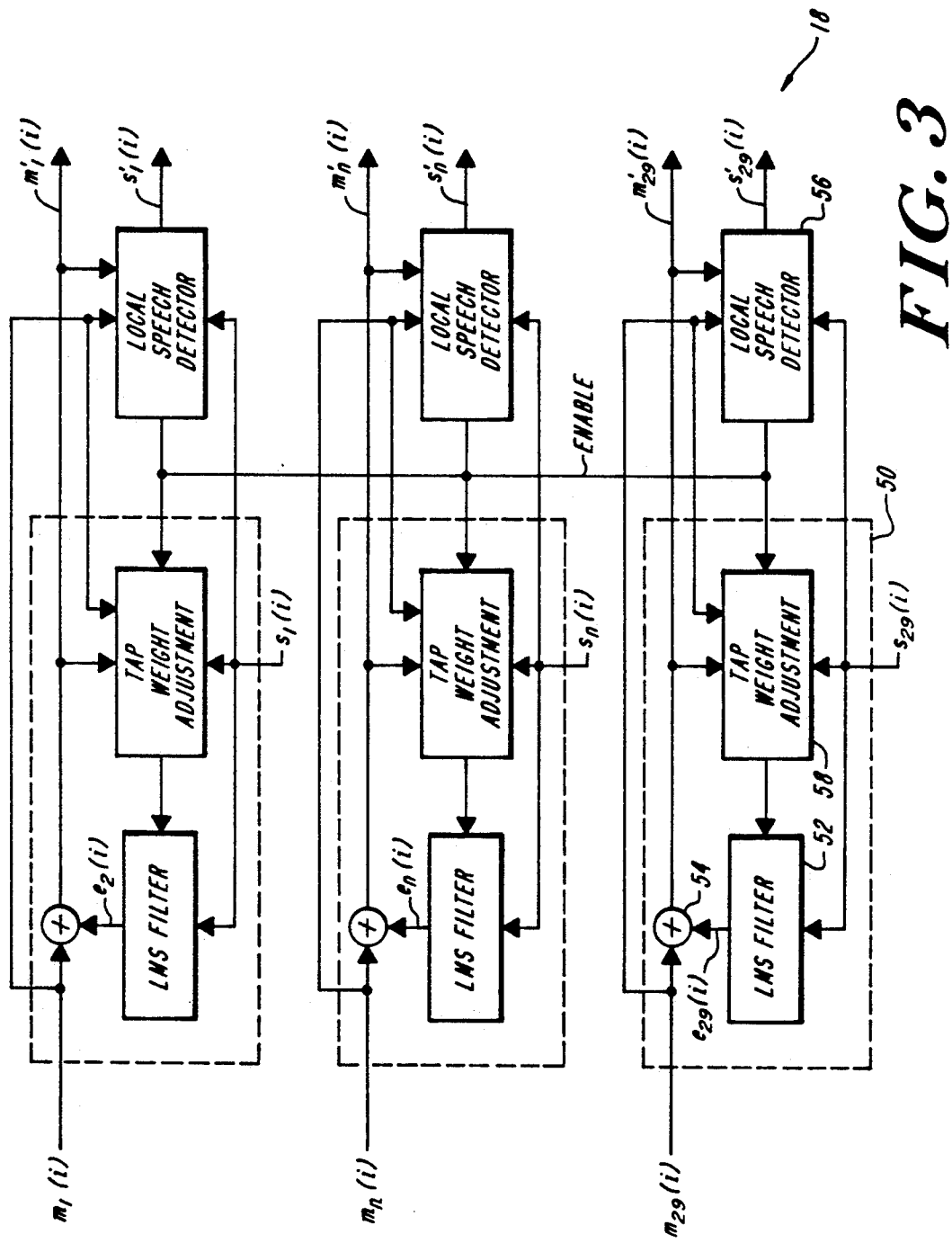
FIG. 3 is a block diagram of a bank of adaptive filters for performing echo cancellation on a set of bandlimited signals.

Referring to FIG. 3, the following describes in more detail the implementation of echo cancellation on each bandlimited microphone signal, $m_n(i)$. Bank 18 includes an adaptive filter for each band. Each adaptive filter estimates the echo in a corresponding band and removes the estimated echo from the corresponding bandlimited microphone signal. Adaptive filter 50, for example, removes the acoustic echo in band n from the bandlimited microphone signal, $m_n(i)$. Toward this end, adaptive filter 50 includes a least-means-square ("LMS") filter 52 whose tap weights are chosen to model the response of the channel between loudspeaker 32 and microphone 10 in the frequency band n.

The bandlimited loudspeaker signal $s_n(i)$ in the same band, n, is applied to the input of LMS filter 52. In response, filter 52 generates an estimate $e_n(i)$ of the acoustic feedback of $s_n(i)$. The estimated echo $e_n(i)$ is then applied to a subtractor 54 which removes the estimated echo signal from $m_n(i)$ to produce an echo corrected signal $m'_n(i)$.

Adaptive filter 50 continuously monitors the corrected signal $m'_n(i)$ to determine whether the LMS filter 52 accurately models the response of the channel between the loudspeaker and microphone. More specifically, echo canceller 18 includes for each band n, a local speech detector 56 which determines whether the bandlimited microphone signal $m_n(i)$ includes any near end speech. When no one is speaking into the microphone, the microphone signal $m_n(i)$ contains only the acoustic feedback from the loudspeaker and any background noise from the room. Thus, if LMS filter 52 properly models the room response, the corrected signal $m'_n(i)$ should be approximately zero during this time (assuming the background noise is relatively small). Accordingly, if $m'_n(i)$ is too large during a moment when local speech detector 56 indicates that no one is speaking at the near end, a tap weight adjustment module 58 within adaptive filter 50 adjusts the tap weights of the LMS filter to reduce $m'_n(i)$ thereby more closely modeling the room response.

The LMS filter 52 for band n is a conventional least means square adaptive filter having L taps. Filter 52 derives its output $e_n(i)$ in response to the input $s_n(i)$ according to the equation.

$$e_n(i) = \sum_{j=0}^{L-1} w_n(j) \cdot s_n(i - j) \quad (1)$$

were $w_n(j)$ is the tap weight of the jth tap of the filter.

The number of taps L required to model the room's response depends on the reverberance of the room in band n. The reverberance varies with the size of the room and losses due to absorption. For frequencies below roughly 1500 Hz and room sizes of twenty by thirty by ten feet, the echo drops by 20 dB in energy in approximately 0.1 seconds. At higher frequencies, the time for echo reverberance to settle is much shorter since more energy is lost as the loudspeaker signal reflects off the room walls. Hence, in the preferred embodiment, each LMS filter in the seven bands below 1500 Hz have on hundred and twenty eight taps. Each filter in the remaining twenty-two higher bands each include only forty-eight taps.

The following describes a preferred method for adjusting the tap weights to adaptively model the response of the channel between loudspeaker 32 and microphone 10. For the moment in time $i+K$, module 58 computes the value of the filter's jth tap weight $w_n(j,i+K)$, according to the following equation:

$$w_n(j, i + K) = w_n(j, i) + \quad (2)$$
$$2B_n \cdot \sum_{p=0}^{K-1} c_n(i + K - p - 1) \cdot s_n(i + K - p - j - 1)$$

where, as described more fully below, K is a thinning ratio, $B_n$ is a normalization factor, and $c_n$ is an output of center clippers 20 described below.

The normalization factor $B_n$ for band n is proportional to the reciprocal of the maximum instantaneous energy $E_n(i)$ of the bandlimited loudspeaker signal $s_n(i)$ within the last L samples, i.e., $B_n = B/2E_n(i)$ where B is a constant. In general, larger values of B yield faster adaptation speeds at the expense of a less accurate estimation of the echo once the adaptive filter has settled. The preferred embodiment sets B equal to $2^{-8}$.

Figure 4A:
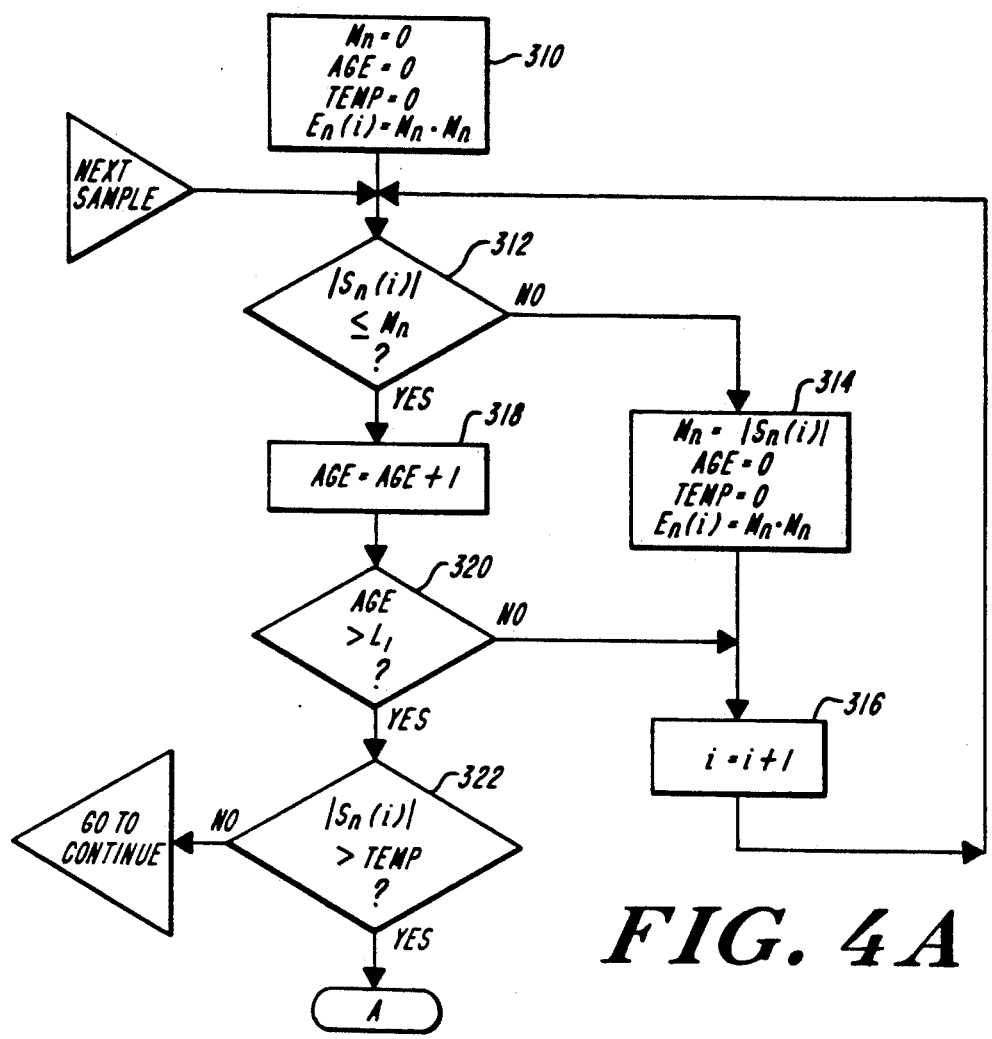
FIGS. 4(a) and 4(b) are a flow chart illustrating a procedure used in updating the tap weights of an adaptive filter.
Figure 4B:
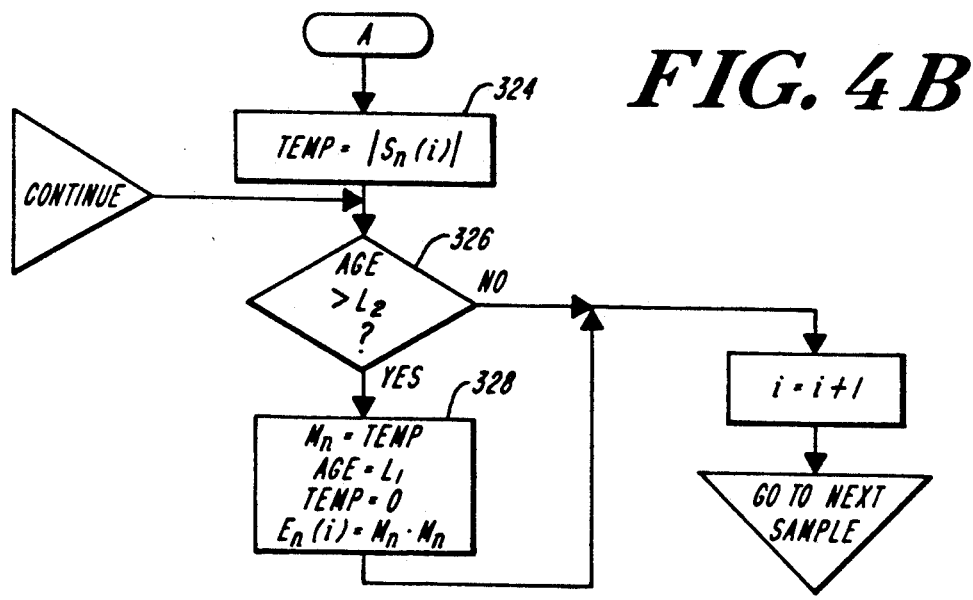

Referring to FIGS. 4(a) and 4(b), module 58 (FIG. 3) maintains a running maximum $M_n$ of the bandlimited loudspeaker signal $s_n(i)$ for purposes of computing the normalization factor $B_n$. $M_n$ is initially set equal to zero. (Step 310). Upon arrival of each sample of $s_n(i)$, module 58 compares the absolute value of the sample $s_n(i)$ to $M_n$. (Step 312). If the most recent sample is greater than $M_n$, $M_n$ is set equal to the absolute value of $s_n(i)$ and $E_n(i)$ is correspondingly updated (i.e., $E_n(i) = M_n \cdot M_n$). (Step 314). The next sample of $s_n(i)$ is then fetched and compared against the new $M_n$. (Steps 316, 312).

If the magnitude of latest sample $s_n(i)$ is less than the current $M_n$, $M_n$ remains unchanged. However, a parameter "age" (initially set to zero in step 310) is incremented to indicate that a new sample has arrived since $M_n$ was last updated. (Step 318). As each new sample is fetched and compared to $M_n$, the parameter age is incremented until the next sample arrives which exceeds $M_n$. If the age parameter exceeds a threshold $L_1$ (preferably equal to L/2), module 58 begins maintaining a temporary maximum, "Temp" (Steps 320, 322). More specifically, as each new sample $s_n(i)$ arrives, it is also compared to "Temp" (initially set to zero in Step 310). (Step 322). If the magnitude of the new sample is greater than Temp, Temp is replaced with the magnitude of the new sample. (Step 324). If the age parameter exceeds a second threshold $L_2$ (preferably equal to 1.5 L), $M_n$ is discarded and replaced with Temp. (Steps 326, 328). The maximum energy $E_n(i)$ is accordingly recomputed and age is updated to indicate the approximate age of the value Temp, i.e., $L_1$. (Steps 330, 322) Temp is accordingly reset to zero. In this manner, the normalization factor $B_n$ for each band n is continually maintained proportional to the maximum instantaneous energy of the loudspeaker signal in band n over the last L samples.

The thinning ratio K in equation 2, determines how often each tap weight is updated. See M. J. Gingell, "A Block Mode Update Echo Canceller Using Custom LSI", Globecom Conference Record, vol. 3, Nov. 1983, p. 1394-97. For example, if $K=1$, each tap weight is updated with each new sample of $s_n(i)$ and $m'_n(i)$. In the preferred embodiment, each tap weight is updated once every eight samples of $s_n(i)$, $m'_n(i)$. (i.e., $K=8$). Further the tap weights are not all updated simultaneously. Upon receipt of a new sample, a first set of tap weights, consisting of every eighth tap weight, is adjusted. Upon arrival of the next sample, module 58 adjusts the weights of all taps adjacent to the taps in the first set. Module 58 repeats this procedure updating the next set of adjacent tap weights with the arrival of each new sample. Upon the arrival of the ninth sample, module 58 returns to the first set of taps to begin a new cycle.

Thus, when the room's acoustic response changes, as for example when the microphone is moved, the tap weights are automatically adjusted according to equation 2. However, the above algorithm is very slow to adjust the tap weights if signals $s_n(i)$ and $m_n(i)$ are highly correlated, narrow band signals. Since speech tends to be a highly correlated, narrow band signal, the tap weights should adjust slowly. However, to hasten convergence, the system employs whitening filters 14, 28 to remove the signal correlation and broaden the spectrum of the signals. Whitening filters 14, 28 are simple fixed, single zero filters having the transfer function:

$$h(z) = 1 - 0.95/z \tag{3}$$

After echo cancellation and other signal processing are performed on the whitened signals, inverse whitening filter 26 undoes the effect of whitening filters 14, 28. Accordingly, the inverse filter's transfer function is the reciprocal of the function $h(z)$:

$$g(z) = 1/h(z) = 1/(1 - 0.95/z) \tag{4}$$

The bandpass architecture also assists in hastening convergence, since, in each band, a signal appears more random and flatter in spectrum.

Figure 5:
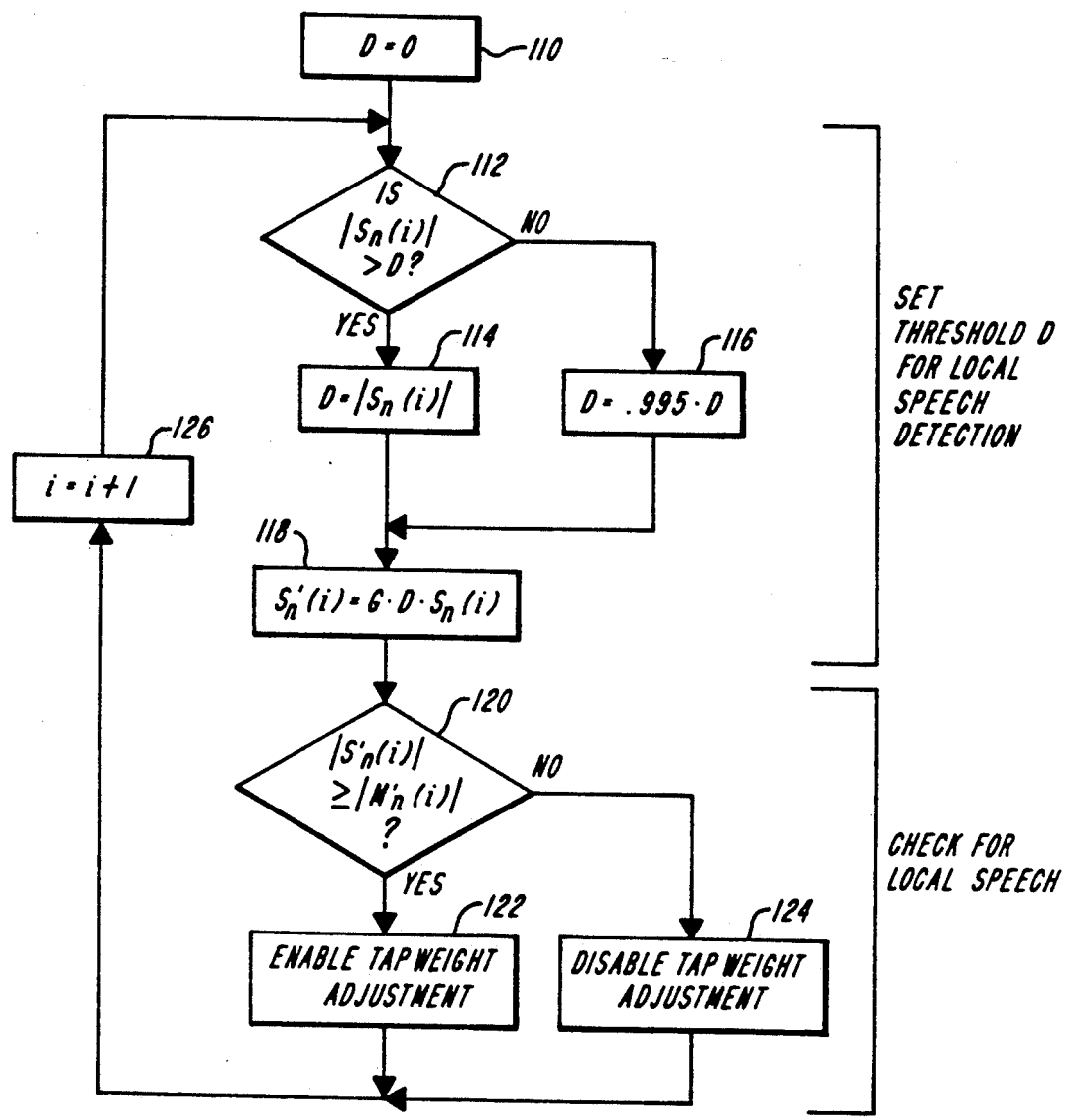
FIG. 5 is a flow chart illustrating a procedure for computing a threshold for local speech detection.

Ideally, module 58 should only update the tap weights when the microphone signal is primarily due to the acoustic feedback from the loudspeaker. If a significant component of the microphone signal results from near end speech into the microphone, continued application of the above described technique to recalculate the weights will cause the tap weights to diverge. Referring to FIG. 5, to determine whether a bandlimited microphone signal $m_n(i)$ includes near end speech, local speech detector 56 first computes, for each sample of the bandlimited loudspeaker $s_n(i)$, an attenuated version $s'_n(i)$ as follows:

$$s'_n(i) = G \cdot D \cdot s_n(i) \tag{5}$$

where G is the loudspeaker to microphone gain, (described below) and D is a dynamic gain which varies with the magnitudes of past samples of the loudspeaker signal (Step 118). If the attenuated loudspeaker signal $s'_n(i)$ is greater than or equal to the microphone signal $m_n(i)$, detector 56 assumes that acoustic feedback predominates and therefore asserts the enable signal calling for adjustment of the tap weights. (Steps 120, 122). If $s'_n(i)$ is less than $m_n(i)$, the detector assumes that the microphone signal includes near end speech. Accordingly, it negates the enable signal, causing module 58 to freeze the tap weights of all adaptive filters at their present values. (Steps 120, 124). Thus, if a local speech detector recognizes speech in any band, the adaptive filters of all bands freeze.

Determining whether the microphone signal contains near end speech is complicated by the room's reverberance. More specifically, the sound from the loudspeaker will reverberate in the room for some time after the loudspeaker is silent. Unless precautions are taken, the local speech detector may mistake the presence of those reverberations in the microphone signal for speech since, during reverberance, the loudspeaker may be silent. As explained below, local speech detector 56 avoids this problem by adjusting the gain D in accordance with the recent history of the loudspeaker signal. If the loudspeaker signal was recently intense (thereby inducing reverberance), gain D is set relatively high to increase the magnitude of the microphone signal required for detector 56 to conclude that local speech is occurring.

Referring to FIG. 5, detector 56 initializes the gain D to zero (Step 110). As each new sample of the bandlimited speech signal $s_n(i)$ arrives, the detector compares the magnitude of the sample to the value of D. (Step 112). If the magnitude of new sample is greater than the present gain D, detector 56 increases D to the magnitude of the new sample. (Step 114). If the new sample is less than or equal to D, detector 56 reduces the magnitude of D by 0.5% of its present value. (Step 116) Thus, the gain decreases slowly from the most recent peak in the loudspeaker signal until a new sample of the loudspeaker signal arrives which is above the gain. The rate of decay is preferably set to approximate the rate at which reverberance dampens. The desired rate may therefore vary with the room characteristics. Further, since reverberance may decay much more rapidly in high frequency bands than in lower frequency bands, different decay rates may be used for each band.

Even if tap weight adjustment is disabled during local speech, the tap weights may still diverge if the loudspeaker emits a sinusoidal or other periodic signal (e.g., if someone at the far end whistles). Whitening filters 14 and 28 discourage such divergence but cannot eliminate it for such extremely narrow bandwidth signals. Accordingly, each tap weight adjustment module 58 (see FIG. 3) continuously compares the energy of the echo corrected microphone signal $m'_n(i)$ to the energy of the uncorrected microphone signal $m_n(i)$. If the corrected signal has at least twice as much energy as the uncorrected signal, divergence is declared for that band and all tap weights are set to zero for that band. All other bands remain unchanged.

Figure 6:
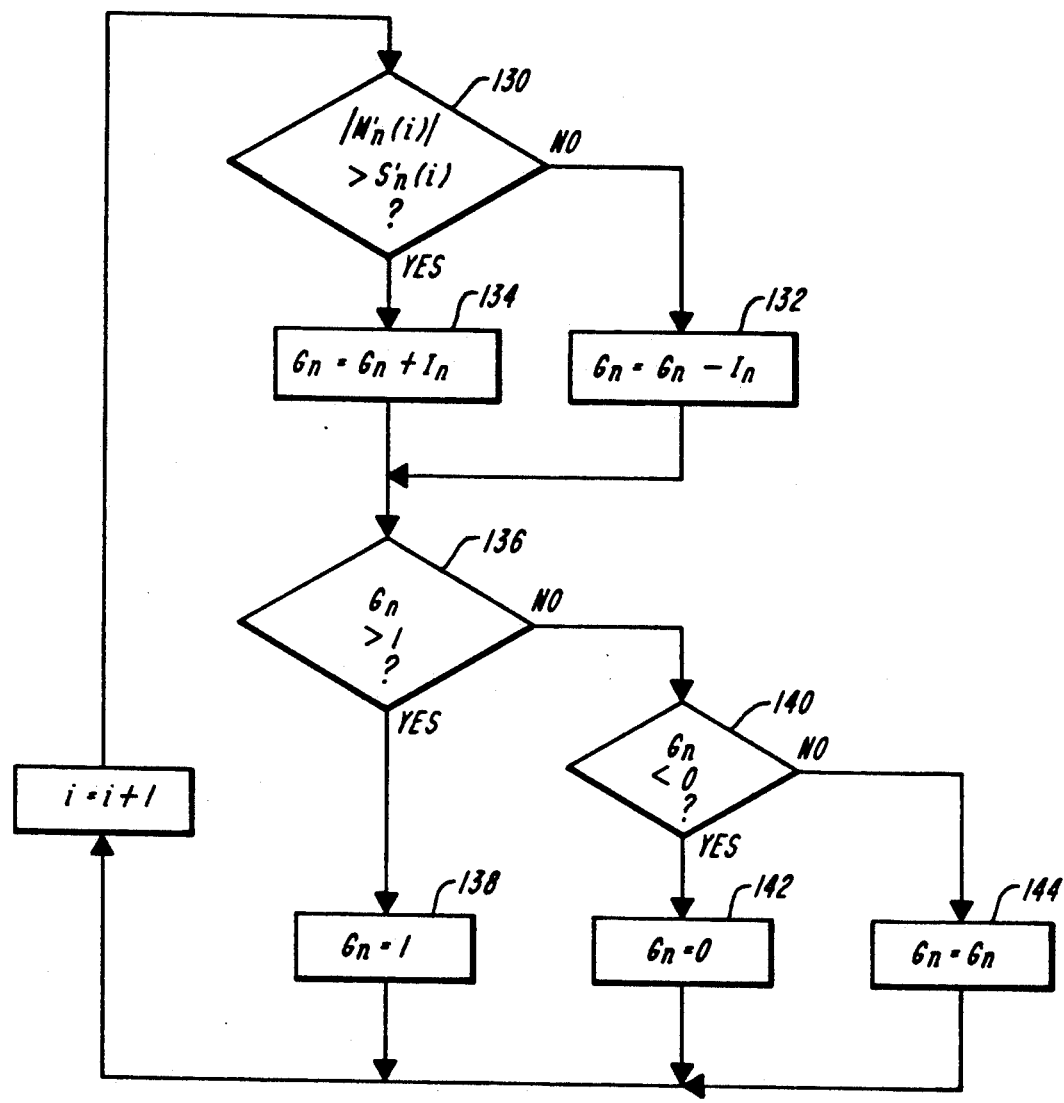
FIG. 6 is a flow chart illustrating a procedure for implementating a variable gain signal clipper.

Referring to FIG. 6, the following describes the operation of center clipper 20 in further detail. As explained above, center-clipping is designed to eliminate residual echo by reducing the microphone signal to zero during periods when no one is speaking at the near end (i.e., no "local speech"). This technique obviously does nothing to remove residual echo during periods when someone is speaking at the near end. However, the residual echo is not noticeable during these periods since it is masked by the local speech.

As explained above, there may be local speech in certain bands, and not in others, as for example when someone whistles into the microphone. Accordingly, center-clipping independently operates in each band, clipping the microphone signal in bands having no local speech and passing it in bands containing local speech.

The clipper determines whether there is local speech in a band in basically the same manner as the local speech detector 56. For example, in band n, clipper 20 compares the echo corrected microphone signal $m'_n(i)$ against the attenuated loudspeaker signal $s'_n(i)$ used by the local speech detector. (Step 130). If $m'_n(i)$ is less than or equal to $s'_n(i)$, clipper 20 assumes there is no local speech, and begins clipping the microphone signal $m'_n(i)$. However, rather than immediately clipping the signal, clipper 20 gradually reduces the gain $G_n$ of the band's clipper circuit to zero. More specifically, the output of the clipper in band n, $c_n(i)$, is related to the input $m'_n(i)$ as follows:

$$c_n(i) = G_n \cdot m'_n(i) \tag{6}$$

Upon the arrival of each sample of $m'_n(i)$ which is less than or equal to $s'_n(i)$, the gain $G_n$ is decreased by a value $I_n$, 0.05 in the illustrated embodiment, until reaching a minimum value of zero. (See Steps 132, 136, 140, 142). This eliminates a clicking sound which may occur if clipping is introduced more abruptly.

If the microphone signal is greater than $s'_n(i)$, clipper 20 assumes there is near end speech and proceeds to remove clipping, allowing the microphone signal $m'_n(i)$ to pass. However, rather than abruptly removing clipping, clipper 20 gradually increases the gain of the clipper circuit (using the same step size as used above i.e., $I_n = 0.05$) until it reaches unity, thereby preventing clicking sounds which may be introduced by abrupt removal of clipping. (See Steps 134, 136, 138, 144).

As explained above, center clipping causes background noise in the room to fade in and out as clipping is activated and deactivated. More specifically, when a person at the near end speaks into the microphone while the listeners at the far end of the communication system remain silent, the remote listeners will hear the background noise in the local room disappear with each pause in the person's voice. To eliminate this effect, noise filler 22 replaces the clipped signal with an artificial noise signal having approximately the same amount of energy as the background noise being clipped. Thus, the echo remains clipped while the background noise is replaced.

Figure 7:
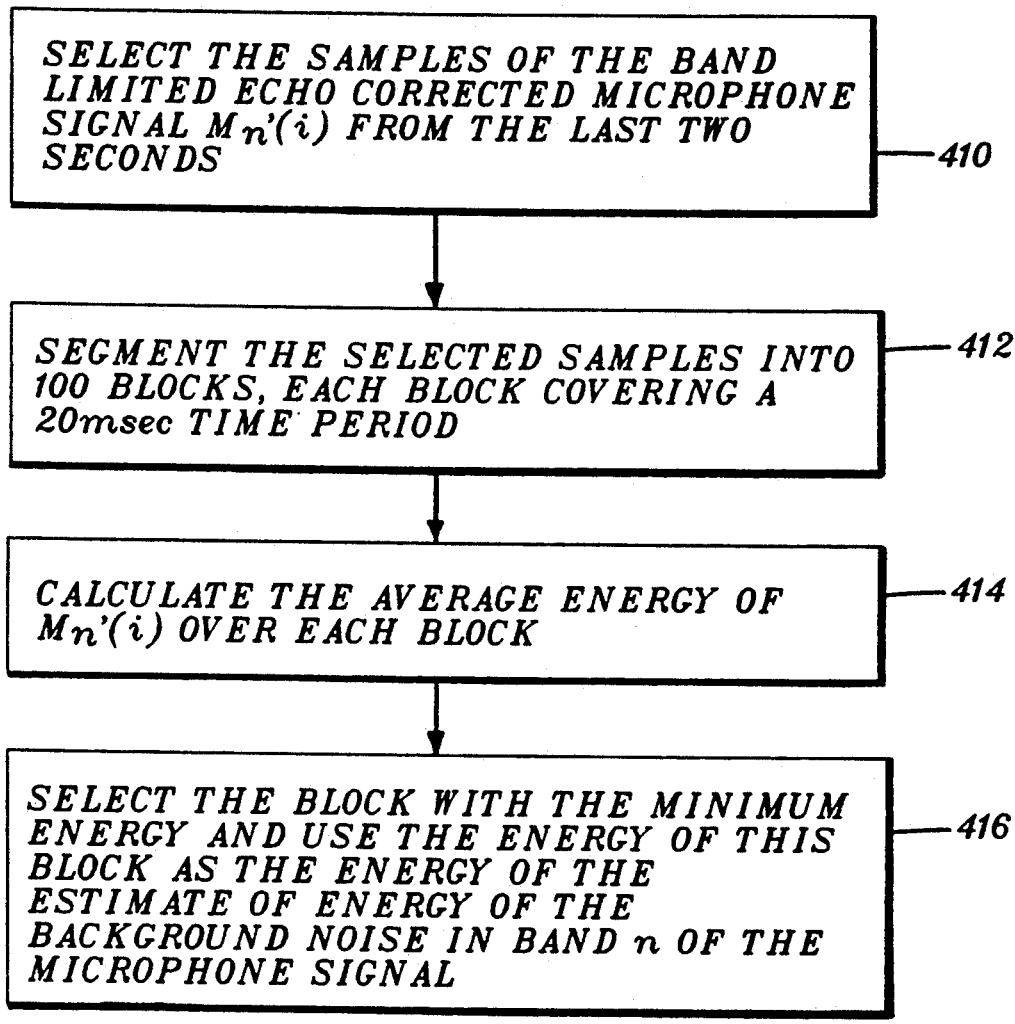
FIG. 7 is a flow chart illustrating a procedure for estimating the energy of the background noise in an echo corrected bandlimited microphone signal.

It is difficult to determine how much of the clipped signal is due to background noise and how much is due to residual echo. To measure the background noise, noise filler 22 examines the history of the echo corrected microphone signal. Presumably, there will be moments when no one is speaking at either end of the communication system. During these moments, the microphone signal contains only the background noise in the room. Referring to FIG. 7, filler 22 attempts to locate those periods and measure the energy of the microphone signal. Toward this end, it breaks the prior samples of the echo corrected microphone signal $m'_n(i)$ into one hundred blocks of samples, each block containing consecutive samples covering a twenty millisecond period of time. (Steps 410, 412). It next calculates the average energy of $m'_n(i)$ over each block. (Step 414). The block having the minimum average energy is assumed to cover a period of time when the microphone signal in band n includes only background noise. Accordingly, the average energy of this block is used as the estimate of the energy of the background noise $E_n$ in the band n. (Step 416).

For each band n, a uniformly distributed pseudo-random noise signal $n_n(i)$ whose energy is equal to that of the estimated background noise is then generated using a random number generator. More specifically, filler 22 first generates a uniformly distributed random signal $u_n(i)$ ranging from $-1$ to 1 in value using a computationally efficient random number generator such as described in P. L. Chu, "Fast Gaussian Random Noise Generator", IEEE Trans. ASSP, ASSP-37, No. 10, Oct. 1989, p. 1593-1597. The random signal is then scaled such that its energy matches that of the background noise. More specifically, the noise signal $n_n(i)$ is derived from the random signal as follows:

$$n_n(i) = \sqrt{3E_n} \cdot u_n(i) \tag{7}$$

After preparing an artificial noise signal $n_n(i)$ which has an energy equivalent to the background noise, filler 22 adds the artificial noise to the clipped microphone signal in an amount complementary to the amount of clipping. More specifically, the filler output $d_n(i)$ is computed as follows:

$$d_n(i) = G_n \cdot m'_n + (1 - G_n) \cdot n_n(i) \tag{8}$$

where $G_n$ is the gain of clipper 20 for band n.

As indicated above, the local speech detector and the center clippers both employ the magnitude of speaker to microphone gain G in determining whether the microphone signal includes near end speech. As explained below, the microphone gain sensor 60 (FIG. 1) continually estimates the gain G, adjusting it with changes in the actual speaker to microphone gain which occur during a telephone conversation (e.g., as when the microphone is moved).

Figure 8A:
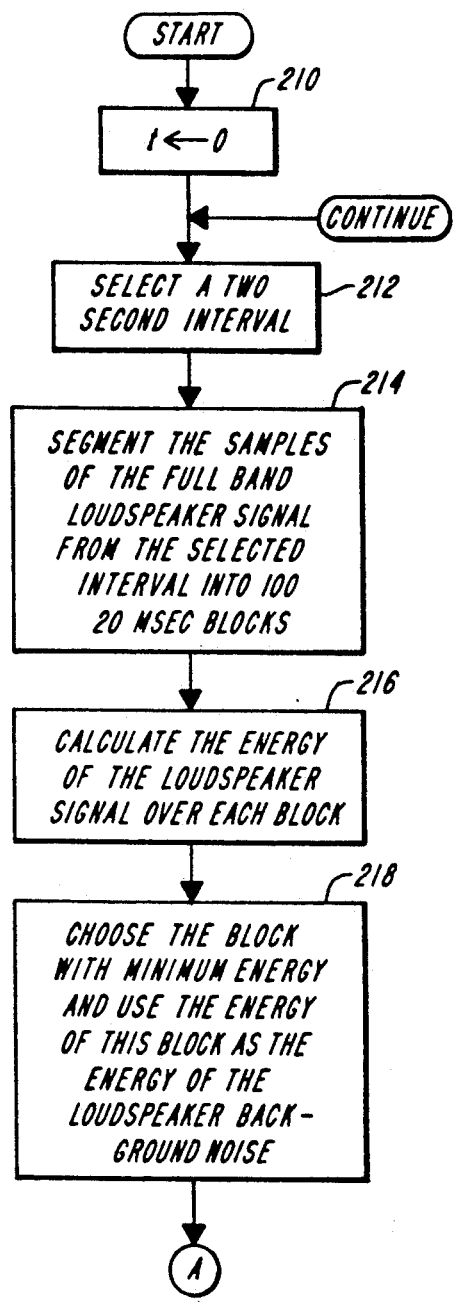
FIGS. 8(a), 8(b) and 8(c) are a flow chart illustrating a procedure for estimating the gain of the channel between a loudspeaker and microphone.
Figure 8B:
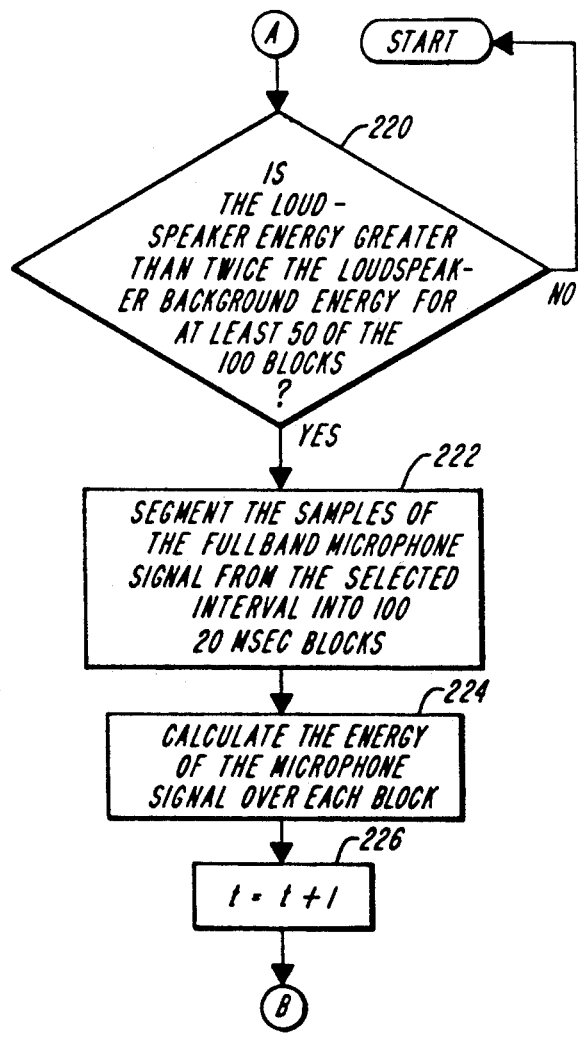
Figure 8C:
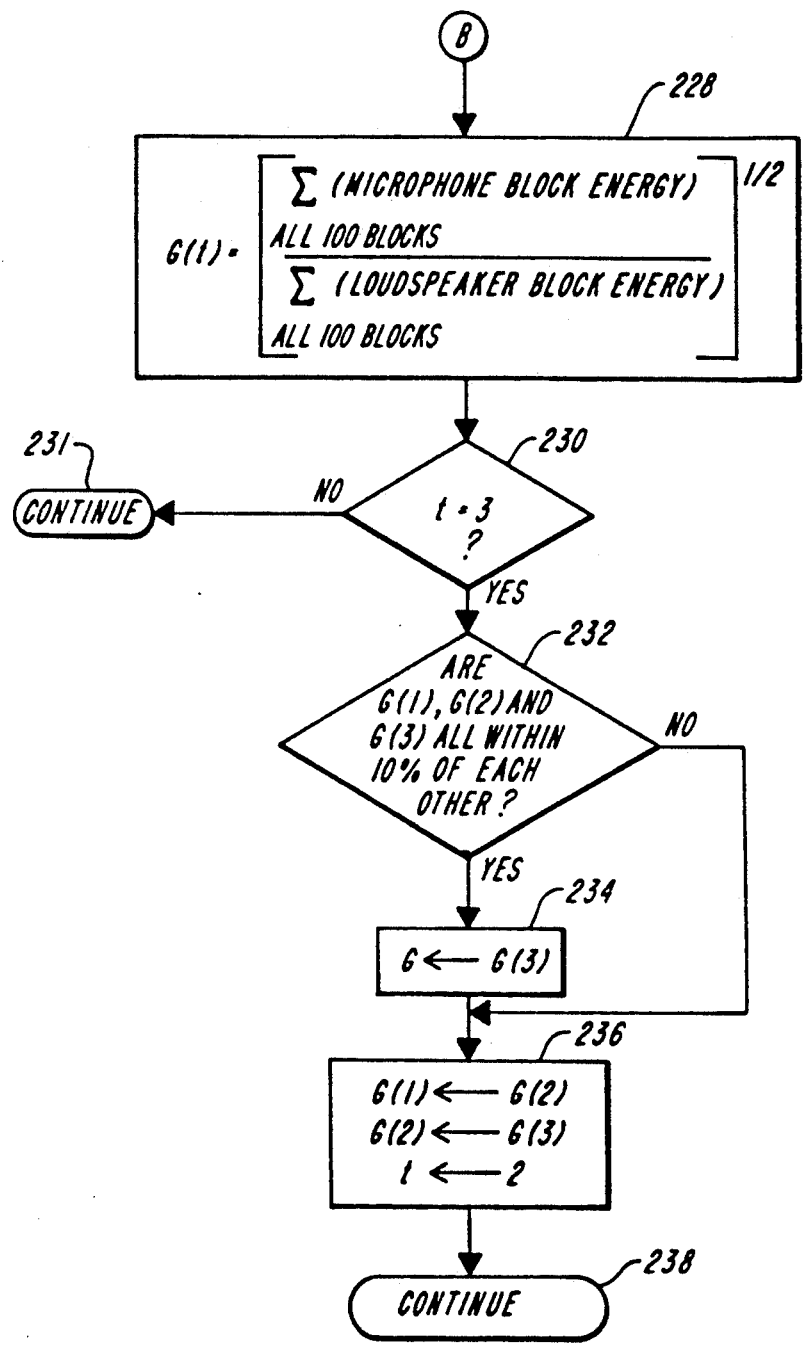

Referring to FIGS. 8(a), 8(b), and 8(c), in estimating the speaker-to-microphone gain, the gain sensor 60 first locates a two second time interval over which the average energy of the full band loudspeaker signal generally exceeds that of the loudspeaker's background noise (step 212). More specifically, for each two second interval, sensor 60 segments the samples of fullband loudspeaker signal s(z) within that interval into 100 consecutive blocks. Thus each block contains samples over a 20 millisecond time period. (Step 214). Sensor 60 next computes the energy of the loudspeaker signal in each block. (Step 216). From these energies, sensor 60 selects the minimum energy as an estimate of energy of the loudspeaker's background noise. (Step 218). The energy of the loudspeaker signal in each block is then compared with the energy of the loudspeaker's background noise. (Step 220). If the energy of the loudspeaker signal is greater than twice the background noise in at least one half of the blocks, sensor 60 concludes that the loudspeaker signal generally exceeds the background noise during this two second interval. (Step 220).

Accordingly, sensor 60 proceeds to calculate the full band energy of microphone signal over the same entire two second interval by computing the energy in each 20 msec block and summing the energies for each of the one hundred blocks. (Step 222, 224, and 228). In the same manner the energy of the loudspeaker signal is computed over the entire two second interval by summing the previously calculated energies for each block. (Step 228). Sensor 60 computes an estimated speaker-to-microphone gain for the interval by computing the square root of the ratio of the full interval microphone energy to the full interval loudspeaker energy. (Step 228).

The sensor repeats the above steps (210–228) until it finds three consecutive two second intervals for which the estimated speaker-to-microphone gains are within ten percent of each other. (Steps 230, 232). Once three such intervals are located, sensor 60 updates the speaker-to-microphone gain G with the estimated speaker-to-microphone gain of the most recent of the three consecutive intervals. (Step 234). Thus, six seconds of loudspeaker only speech are required to find the correct ratio. The sensor continuously monitors the fullband loudspeaker signal, updating the gain G with each new two second interval. (Steps 230, 231, 232, 234, 236, 238).

Additions, subtractions, deletions and other modifications of the preferred particular embodiments of the inventions will be apparent to those practiced in the art and are within the scope of the following claims.

What is claimed is:

1. An echo cancelling device for reducing the effects of acoustic feedback between a loudspeaker and microphone in a communication system, comprising:
   a first signal splitter for separating a microphone signal into a plurality of bandlimited microphone signals,
   a second signal splitter for separating a loudspeaker signal into a plurality of bandlimited loudspeaker signals, the band of frequencies of each bandlimited loudspeaker signal being approximately the same as the band of frequencies of a corresponding bandlimited microphone signal,
   a plurality of band echo estimators, each band echo estimator for generating an echo estimation signal for a bandlimited loudspeaker signal, said echo estimation signal representing an approximation of the acoustic feedback of said bandlimited loudspeaker signal into a corresponding bandlimited microphone signal,
   at least one subtractor for subtracting an echo estimation signal from a bandlimited microphone signal of the same frequency band as the echo estimation signal to produce a bandlimited echo corrected microphone signal,
   means for estimating whether a first bandlimited echo corrected microphone signal is substantially derived from acoustic feedback between said loudspeaker and said microphone, and
   at least one signal clipper for attenuating said first bandlimited echo corrected microphone signal during periods of time during which said first bandlimited echo corrected microphone signal is substantially derived from acoustic feedback between said loudspeaker and microphone.

2. The echo cancelling device of claim 1 wherein each said signal clipper comprises a gain adjustment module for gradually increasing the attenuation of said signal clipper following the commencement of each said period during which said bandlimited echo corrected signal is substantially derived from acoustic feedback.

3. The echo cancelling device of claim 2 wherein each said gain adjustment module gradually decreases the attenuation of said signal clipper following the termination of each said period during which said bandlimited echo corrected signal is substantially derived from acoustic feedback.

4. The echo cancelling device of claim 1 further comprising a plurality of noise fillers, each noise filler comprising:
   means for generating a background noise estimation signal representing the background noise contained in a bandlimited microphone signal, and
   means for adding said background estimation signal to said bandlimited microphone signal to compensate for attenuation of said background noise by said at least one signal clipper.

5. The echo cancelling device of claim 4 wherein each noise filler adds said background estimation signal to said attenuated bandlimited echo corrected microphone signal in an amount complementary to the magnitude of said attenuation.

6. The echo cancelling device of claim 4 wherein each said means for generating a background noise estimation signal comprises:
   means for estimating the energy of a background noise component of said bandlimited microphone signal, and
   means for generating said background noise estimation signal having an energy approximately equal to said estimated energy of said background noise component.

7. The echo cancelling device of claim 6 wherein said means for estimating the energy of a background noise component of said bandlimited microphone signal comprises:
   means for estimating the interval energy of said bandlimited microphone signal in each of a plurality of time intervals, and
   means for selecting the minimum estimated energy from said estimated interval energies for use as said estimated energy of said background noise component.

8. An echo cancelling device for reducing the effects of acoustic feedback between loudspeaker and microphone in a communication system, comprising:
   a first signal splitter for separating a near end microphone signal into a plurality of bandlimited microphone signals,
   a second signal splitter for separating a loudspeaker signal into a plurality of bandlimited loudspeaker signals, the band of frequencies of each bandlimited loudspeaker signal being approximately the same as the band of frequencies of a corresponding bandlimited microphone signal,
   a plurality of adaptive echo estimators, each adaptive echo estimator for generating an echo estimation signal for an associated bandlimited loudspeaker signal, said echo estimation signal representing an approximation of the acoustic feedback of said bandlimited loudspeaker signal into a corresponding bandlimited microphone signal,
   at least one subtractor for subtracting an echo estimation signal from an associated bandlimited microphone signal having the same frequency band as said echo estimation signal, to produce a bandlimited echo corrected microphone signal,
   at least one local speech detector for identifying periods of time during which said near end microphone signal is substantially derived from acoustic feedback between said loudspeaker and microphone, and
   at least one adjustment module for adjusting characteristics of at least one said adaptive echo estimator during said identified periods of time.

9. The echo cancelling device of claim 8 wherein said at least one local speech detector comprises:
   means for computing an attenuated version of a bandlimited loudspeaker signal, and
   means for comparing said attenuated bandlimited loudspeaker signal to a bandlimited echo corrected microphone signal to determine whether said bandlimited echo corrected microphone signal is substantially derived from acoustic feedback between said loudspeaker and microphone.

10. The echo cancelling device of claim 9 wherein said means for computing an attenuated version of said bandlimited loud speaker signal comprises:

means for calculating a dynamic gain which varies with the magnitude of past samples of said bandlimited loudspeaker signal, and means for attenuating said bandlimited loudspeaker signal based on the value of said dynamic gain.

11. The echo cancelling device of claim 10 wherein said means for calculating a dynamic gain comprises:

means for determining the magnitude of the most recent peak of said bandlimited loudspeaker signal, and means for attenuating said dynamic gain based on the length of time since said most recent peak occurred in said bandlimited loudspeaker signal.

12. The echo cancellation device of claim 10 wherein said means for calculating a dynamic gain comprises:

means for setting said dynamic gain equal to the current value of said bandlimited loudspeaker signal if said current value of said bandlimited loudspeaker signal is greater than said dynamic gain.

13. The echo cancellation device of claim 12 wherein said means for calculating a dynamic gain further comprises means for attenuating said dynamic gain at a rate approximately equal to the rate at which reverberance of said bandlimited loudspeaker signal dampens.

14. The echo cancelling device of claim 9 wherein said means for computing an attenuated version of said bandlimited loudspeaker signal comprises:

means for estimating the effective gain of the acoustic channel between said loudspeaker and microphone, and means for attenuating said bandlimited loudspeaker signal based o the value of said effective gain.

15. The echo cancelling device of claim 8 wherein said at least one local speech detector comprises a plurality of local speech detectors, each for identifying periods of time during which an associated bandlimited echo corrected microphone signal is substantially derived from acoustic feedback between said loudspeaker and microphone.

16. The echo cancelling device of claim 8 and further comprising at least one divergence detector for determining when an adaptive echo estimator is diverging, said at least one adjustment module further comprising a means for resetting the characteristics of an echo estimator which is diverging.

17. The echo cancelling device of claim 16 wherein said at least one divergence detector comprises means for comparing the energy of a bandlimited microphone signal to the energy of a corresponding bandlimited echo corrected microphone signal, and means for declaring when said adaptive echo estimator is diverging based on said comparison.

18. An echo cancelling device for reducing the effects of acoustic feedback between a loudspeaker and microphone in a communication system, comprising:

a first whitening filter for receiving a microphone signal and generating in response thereto a whitened version of said microphone signal, a first signal splitter for separating said whitened microphone signal into a plurality of bandlimited microphone signals, a second whitening filter for receiving a loudspeaker signal and generating in response thereto a whitened version of said loudspeaker signal, a second signal splitter for separating said whitened loudspeaker signal into a plurality of bandlimited loudspeaker signals, the band of frequencies of each bandlimited loudspeaker signal being approximately the same as the band of frequencies of a corresponding bandlimited microphone signal, a plurality of adaptive band echo estimators, each adaptive band echo estimator for generating an echo estimation signal for a bandlimited loudspeaker signal, said echo estimation signal representing an approximation of the acoustic feedback of said bandlimited loudspeaker signal into a corresponding bandlimited microphone signal, at least one subtractor for subtracting an estimation signal from a bandlimited microphone signal of the same frequency band as the estimation signal to produce a bandlimited echo corrected microphone signal.

19. The echo cancelling system of claim 18 further comprising:

signal composer for composing said bandlimited echo correction microphone signals into a composite microphone signal, and an inverse whitening filter for receiving said composite microphone signal and performing the inverse operation of said first whitening filter.

20. An echo cancelling device for reducing the effects of acoustic feedback between a loudspeaker and microphone in a communication system, comprising:

a simple whitening filter having a transfer function with approximately one zero, said whitening filter for receiving a microphone signal and generating in response thereto a whitened version of said microphone signal, at least one adaptive filter for generating an echo estimation signal representing an approximation of a component of said whitened version of said microphone signal due to acoustic feedback between said loudspeaker and microphone, a subtractor for removing said echo estimation signal from said whitened version of said microphone signal to yield an echo corrected microphone signal.

21. The echo cancelling device of claim 20 wherein said simple whitening filter has a transfer function $h(z)=a-b/z$ where a is approximately 1 and b is approximately 0.95.

22. The echo cancelling device of claim 21 further comprising:

an inverse whitening filter, having a transfer function $g(z)=c/(d-e/z)$ where c and d are approximately equal to one and e is approximately equal to 0.95, for receiving said echo corrected microphone signal and generating in response thereto at unwhitened version thereof.

23. An echo cancelling device for reducing the effects of acoustic feedback between a loudspeaker and microphone in a communication system, comprising:

a first whitening filter for receiving a near end microphone signal and generating in response thereto a whitened version of said near end microphone signal, a first signal splitter for separating said whitened microphone signal into a plurality of bandlimited microphone signals, a second whitening filter for receiving a loudspeaker signal and generating in response thereto a whitened version of said loudspeaker signal, a second signal splitter for separating said whitened loudspeaker signal into a plurality of bandlimited loudspeaker signals, the band of frequencies of each bandlimited loudspeaker signal being approximately the same as the band of frequencies of a corresponding bandlimited microphone signal, a plurality of adaptive echo estimators, each adaptive echo estimator for generating an echo estimation signal for an associated bandlimited loudspeaker signal, said echo estimation signal representing an approximation of the acoustic feedback of said bandlimited loudspeaker signal into a corresponding bandlimited microphone signal, a subtractor means for subtracting from each bandlimited microphone signal an echo estimation signal having the same frequency band as the bandlimited microphone signal, to produce a bandlimited echo corrected microphone signal, a plurality of local speech detectors each for identifying periods of time during which a corresponding bandlimited microphone signal is substantially derived from acoustic feedback between said loudspeaker and microphone, and a plurality of adjustment modules each for adjusting characteristics of at least one said adaptive echo estimator during said identified periods of time when a corresponding bandlimited microphone signal is substantially derived from acoustic feedback, and a plurality of signal clippers, each clipper for attenuating a corresponding bandlimited echo corrected microphone signal during periods of time during which said bandlimited echo corrected microphone signal is substantially derived from acoustic feedback between said loudspeaker and microphone, and a plurality of noise fillers, each noise filler comprising:
a means for generating a background noise estimation signal representing the background noise contained in a bandlimited microphone signal, and
a means for adding said background estimation signal to said attenuated bandlimited echo corrected microphone signal in an amount complementary to the magnitude of said attenuation.

24. A method for reducing the effects of acoustic feedback between a loudspeaker and microphone in a communication system, comprising the steps of:
separating a microphone signal into a plurality of bandlimited microphone signals,
separating a loudspeaker signal into a plurality of bandlimited loudspeaker signals, the band of frequencies of each bandlimited loudspeaker signal being approximately the same as the band of frequencies of corresponding bandlimited microphone signal,
generating an echo estimation signal for each bandlimited loudspeaker signal, each said echo estimation signal representing an approximation of the acoustic feedback of a bandlimited loudspeaker signal into a corresponding bandlimited microphone signal,
subtracting an echo estimation signal from a bandlimited microphone signal of the same frequency band as the echo estimation signal to produce a bandlimited echo corrected microphone signal, and
attenuating said bandlimited echo corrected microphone signal during periods of time during which said bandlimited echo corrected microphone signal is substantially derived from acoustic feedback between said loudspeaker and microphone.

25. The method of claim 24 wherein said attention step comprises gradually increasing the attenuation of said bandlimited echo corrected signal following the commencement of each said period during which said bandlimited echo corrected signal is substantially derived from acoustic feedback.

26. The method claim 25 wherein said attenuation step further comprises gradually decreasing the attenuation of said bandlimited echo corrected signal following the termination of each said period during which said bandlimited echo corrected signal is substantially derived from acoustic feedback.

27. The method claim 24 further comprising the steps of:
generating a background noise estimation signal representing the background noise contained in a bandlimited microphone signal, and
adding said background estimation signal to said attenuated bandlimited echo corrected microphone signal during said period of time during which said bandlimited echo corrected signal is substantially derived from acoustic feedback.

28. The method of claim 27 wherein said background estimation signal is added to said attenuated bandlimited echo corrected microphone signal in an amount complementary to the magnitude of said attenuation.

29. The method of claim 28 wherein generating a background noise estimation signal comprises the steps of:
estimating the energy of a background noise component of said bandlimited microphone signal, and
generating said background noise estimation signal having an energy approximately equal to said estimated energy of said background noise component.

30. The method of claim 29 wherein estimating the energy of a background noise component of said bandlimited microphone signal comprises the steps of:
estimating the interval energy of said bandlimited microphone signal in each of a plurality of time intervals,
selecting the minimum estimated energy from said estimated interval energies for use as said estimated energy of said background noise component.

31. A method for reducing the effects of acoustic feedback between loudspeaker and microphone in a communication system, comprising the steps of:
separating a near end microphone signal into a plurality of bandlimited microphone signals,
separating a loudspeaker signal into a plurality of bandlimited loudspeaker signals, the band of frequencies of each bandlimited loudspeaker signal being approximately the same as the band of frequencies of a corresponding bandlimited microphone signal,
applying each echo bandlimited loudspeaker signal to a corresponding adaptive echo estimator which in response generates an echo estimation signal, each said echo estimation signal representing an approximation of the acoustic feedback of said bandlimited loudspeaker signal into a corresponding bandlimited microphone signal,
subtracting an echo estimation signal from an associated bandlimited microphone signal having the same frequency band as said echo estimation signal, to produce a bandlimited echo corrected microphone signal, identifying periods of time during which said near end microphone signal is substantially derived from acoustic feedback between said loudspeaker and microphone, and adjusting characteristics of at least one said adaptive echo estimator during said identified periods of time.

32. The method of claim 31 wherein identifying periods of time comprises the steps of:

computing an attenuated version of a bandlimited loudspeaker signal, and comparing said attenuated bandlimited loudspeaker signal to a bandlimited echo corrected microphone signal to determine whether said bandlimited echo corrected microphone signal is substantially derived from acoustic feedback between said loudspeaker and microphone.

33. The method of claim 32 wherein computing an attenuated version of said bandlimited loudspeaker signal comprises the steps of:

calculating a dynamic gain which varies with the magnitude of past samples of said bandlimited loudspeaker signal, and attenuating said bandlimited loudspeaker signal based on the value of said dynamic gain.

34. The echo cancelling device of claim 33 wherein calculating a dynamic gain comprises the steps of:

determining the magnitude of the most recent peak of said bandlimited loudspeaker signal, and attenuating said dynamic gain based on the length of time since said most recent peak occurred in said loudspeaker signal.

35. The method of claim 33 wherein calculating a dynamic gain comprises the steps of:

setting said dynamic gain equal to the current value of said bandlimited loudspeaker signal if said current value of said bandlimited loudspeaker signal is greater than said dynamic gain.

36. The method of claim 35 wherein calculating a dynamic gain further comprises attenuating said dynamic gain at a rate approximately equal to the rate at which reverberance of said bandlimited loudspeaker signal dampens.

37. The method of claim 32 wherein computing an attenuated version of said bandlimited loudspeaker signal comprises the steps of:

estimating the effective gain of the acoustic channel between said loudspeaker and microphone, and attenuating said bandlimited loudspeaker signal based on the value of said effective gain.

38. A method for reducing the effects of acoustic feedback between a loudspeaker and microphone in a communication system, comprising the steps of:

receiving a microphone signal and generating in response thereto a whitened version of said microphone signal, separating said whitened microphone signal into a plurality of bandlimited microphone signals, receiving a loudspeaker signal and generating in response thereto a whitened version of said loudspeaker signal, separating said whitened loudspeaker signal into a plurality of bandlimited loudspeaker signals, the band of frequencies of each bandlimited loudspeaker signal being approximately the same as the band of frequencies of a corresponding bandlimited microphone signal, generating an echo estimation signal for each bandlimited loudspeaker signal, each said echo estimation signal representing an approximation of the acoustic feedback of said bandlimited loudspeaker signal into a corresponding bandlimited microphone signal, subtracting each estimation signal from a bandlimited microphone signal of the same frequency band as the estimation signal to produce a bandlimited echo corrected microphone signal.

39. The method of claim 38 further comprising the steps of:

composing said bandlimited echo correction microphone signals into a composite microphone signal, and performing the inverse operation of said first whitening filter on said composite microphone signal.

40. An method for reducing the effects of acoustic feedback between a loudspeaker and microphone in a communication system, comprising the steps of:

receiving a near end microphone signal and generating in response thereto a whitened version of said near end microphone signal, separating said whitened microphone signal into a plurality of bandlimited microphone signals, receiving a loudspeaker signal and generating in response thereto a whitened version of said loudspeaker signal, separating said whitened loudspeaker signal into a plurality of bandlimited loudspeaker signals, the band of frequencies of each bandlimited loudspeaker signal being approximately the same as the band of frequencies of a corresponding bandlimited microphone signal, generating an echo estimation signal for each bandlimited loudspeaker signal, each said echo estimation signal representing an approximation of the acoustic feedback of said bandlimited loudspeaker signal into a corresponding bandlimited microphone signal, subtracting each estimation signal from an associated bandlimited microphone signal having the same frequency band as the estimation signal, to produce a bandlimited echo corrected microphone signal, identifying periods of time during which a corresponding bandlimited microphone signal is substantially derived from acoustic feedback between said loudspeaker and microphone, attenuating a corresponding bandlimited echo corrected microphone signal during periods of time during which said bandlimited echo corrected microphone signal is substantially derived from acoustic feedback between said loudspeaker and microphone, generating a background noise estimation signal representing the background noise contained in a bandlimited microphone signal, and adding said background estimation signal to said attenuated bandlimited echo corrected microphone signal in an amount complementary to the magnitude of said attenuation.

* * * * *

UNITED STATES PATENT AND TRADEMARK OFFICE
CERTIFICATE OF CORRECTION

PATENT NO.    : 5,305,307

DATED         : April 19, 1994

INVENTOR(S)   : Peter L. Chu

It is certified that error appears in the above-identified patent and that said Letters Patent is hereby corrected as shown below:

On title page, item [56],
In the References Cited section, Eriksson, U.S. Patent 4,677,676 second occurrence, should be 4,677,677;

In the S.. Gay reference, "©" should be --®--;

Column 6, line 51, "mn(i)" should be --$m_n(i)$--;

Column 11, line 63, "un(i)" should be --$u_n(i)$--;

Column 15, claim 14, line 32, "o" should be --on--.

Signed and Sealed this

Fifth Day of December, 1995

Attest:

*Attesting Officer*

BRUCE LEHMAN

*Commissioner of Patents and Trademarks*